Figure 1:
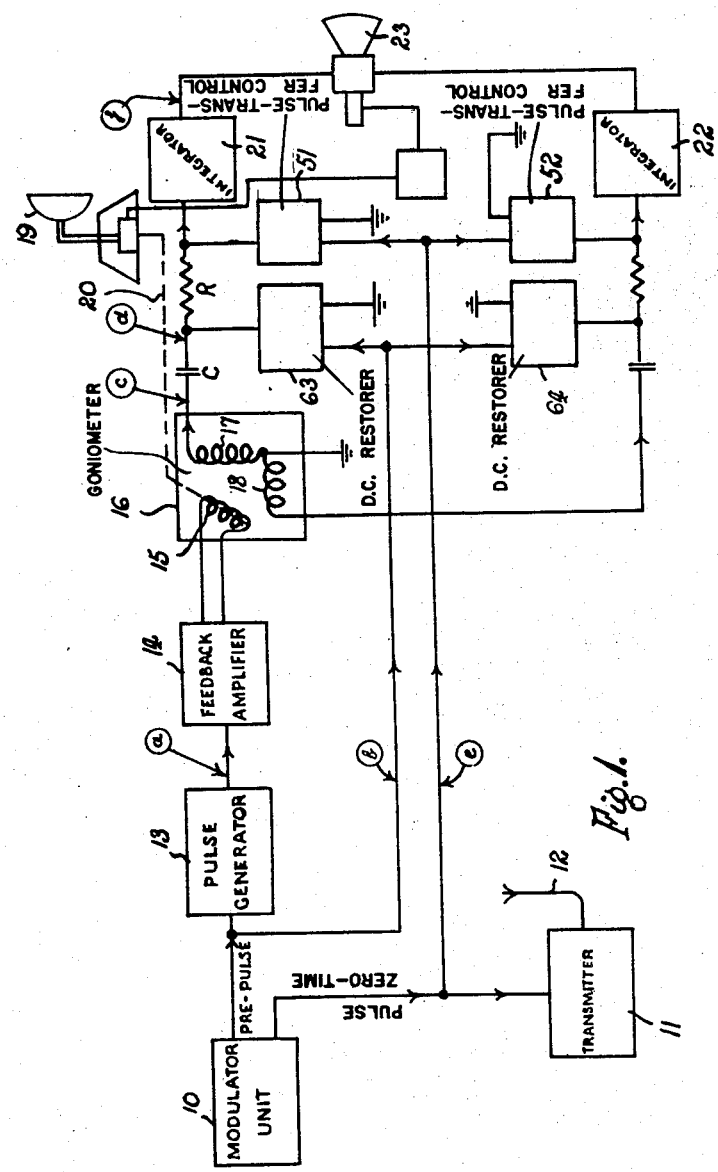

Nov. 14, 1950            L. JOFEH            2,529,876

GENERATOR FOR ELECTRICAL OSCILLATIONS

Filed Dec. 14, 1948            4 Sheets-Sheet 1

INVENTOR
LIONEL JOFEH
BY
HIS ATTORNEY

Nov. 14, 1950  L. JOFEH  2,529,876
GENERATOR FOR ELECTRICAL OSCILLATIONS
Filed Dec. 14, 1948  4 Sheets-Sheet 3

INVENTOR
LIONEL JOFEH
HIS ATTORNEY

Nov. 14, 1950 L. JOFEH 2,529,876
GENERATOR FOR ELECTRICAL OSCILLATIONS
Filed Dec. 14, 1948 4 Sheets-Sheet 4

INVENTOR
LIONEL JOFEH
BY
Herbert H. Thompson
HIS ATTORNEY

Patented Nov. 14, 1950

2,529,876

UNITED STATES PATENT OFFICE 2,529,876

GENERATOR FOR ELECTRICAL OSCILLATIONS

Lionel Jofeh, Stonehouse, England, assignor of one-half to A. C. Cossor Limited, London, England, a company of Great Britain, and one-half to The Sperry Gyroscope Company Limited, Brentford, England, a company of Great Britain Application December 14, 1948, Serial No. 65,245
In Great Britain December 12, 1947

8 Claims. (Cl. 343—5)

The present invention relates to generators for electrical oscillations and is concerned with time base circuits of the type adapted to provide two trains of pulses of saw-tooth wave form whose amplitudes and polarities are collectively representative of the angular position of a rotatable member.

It has been proposed to provide a time base circuit of this type for use in radar plan position indicators to cause radial deflection of an electron beam in a direction which is at any instant fixedly related to the orientation of a rotatable, directional, transmitting or receiving aerial at that instant.

In this arrangement an inductor is caused to rotate in synchronism with the receiving aerial and to co-operate with two fixed inductors whose axes are displaced 90° relatively to one another. Pulses of saw-tooth wave form are applied to the rotatable inductor which results in the induction of saw-tooth voltages in the two fixed inductors. The amplitude and polarities of the two induced voltages are dependent upon the sine and cosine respectively of the two angles made between the rotatable inductor and the two fixed inductors.

These induced voltages are applied to the deflecting plates or coils of a cathode ray tube, and produce the radial deflection of the electron beam therein in the manner previously described.

The beam current is normally kept low by means of a suitable bias voltage applied to a control electrode of the tube whereby the trace is either invisible or of low brilliance until an echo signal is received. This signal is applied to increase the beam current and hence brighten the trace. It is arranged that the commencement of each saw-tooth pulse coincides with the instant of transmission of an exploring pulse, and hence the distance of a brightened part of the trace from the centre of rotation thereof is a measure of the distance from the location of the radar equipment of the reflecting object causing the echo signal. Furthermore, as the direction of each radial sweep of the trace is fixedly related to the orientation of the transmitting or receiving aerial at the time when the sweep is made, the angular position of the brightened part of the trace is a measure of the angular position of the reflecting object from the location of the radar equipment.

In this way a plan position indication of reflecting objects around the radar equipment is provided.

In order to obtain an accurate plan position indication each radial sweep of the electron beam must be of a constant velocity which is the same for each sweep. Owing to the leakage inductance of the rotatable and fixed inductors, however, the output currents of the fixed inductors are not of truly linear saw-tooth wave form. Consequently the outward radial sweep of the electron beam of the cathode ray tube is not of constant velocity, and hence errors in the distance indications on the screen occur. In some applications such errors are inadmissible. For instance, in a harbour control radar installation great accuracy of measurement is required; for example, it may be required that the bearing error must not be greater than ±0.25° at any point in the display and the range error must not be greater than ±100 yds. in 4 miles. To obtain a display giving such accuracy of indication it is necessary to ensure that the current flowing in the deflector coils of the cathode ray tube varies linearly with time to a high degree of accuracy.

The main object of the present invention is to provide an improved time base circuit of the type specified which can be arranged to produce saw tooth currents which are of the high degree of accuracy referred to.

According to the present invention a time base circuit of the type specified comprises an output circuit including two inductors, an input circuit including an inductor co-operating with each of the inductors of the output circuit and rotatable relatively to the inductors of the output circuit in synchronism with the rotation of said rotatable member, a source of pulses of rectangular wave form, means for applying the pulses of rectangular wave form to the input circuit, and means for integrating the respective outputs of the inductors in the output circuit to provide said pulses of saw-tooth wave form, the inductors in the input and output circuits being so arranged that the amplitude of the voltages produced in the two inductors of the output circuit are substantially proportional to the sine and cosine respectively of the angle of displacement of the rotatable member from a datum. Usually the input circuit comprises a single inductor co-operating with both the inductors of the output circuit but it may comprise two separate inductors co-operating respectively with the two inductors of the output circuit.

Owing to stray capacitance and leakage inductance associated with the inductors, each rectangular pulse in the inductors of the output circuit is in the form of a steep leading edge followed by a damped sinusoid, a portion of constant voltage, and a steep trailing edge ending with a further damped sinusoid. The effect of the sinusoids is to distort the linearity of the commencement and termination of each working stroke of the saw-tooth pulses produced, and hence where the saw-tooth pulses are used in a plan position indicator, errors may arise in the indicated positions of near and distant reflecting objects. When the plan position indicator is required to give an accurate indication of the positions of reflecting objects within the two extremes of range, these errors may be of no consequence.

It may be, however, that accurate position indication is required of reflecting objects at short range, and it is a further object of the present invention to provide means whereby this can be achieved.

Further according to the invention, therefore, means are provided for preventing an initial part of each rectangular output pulse from reaching said integrator devices.

Figure 2:
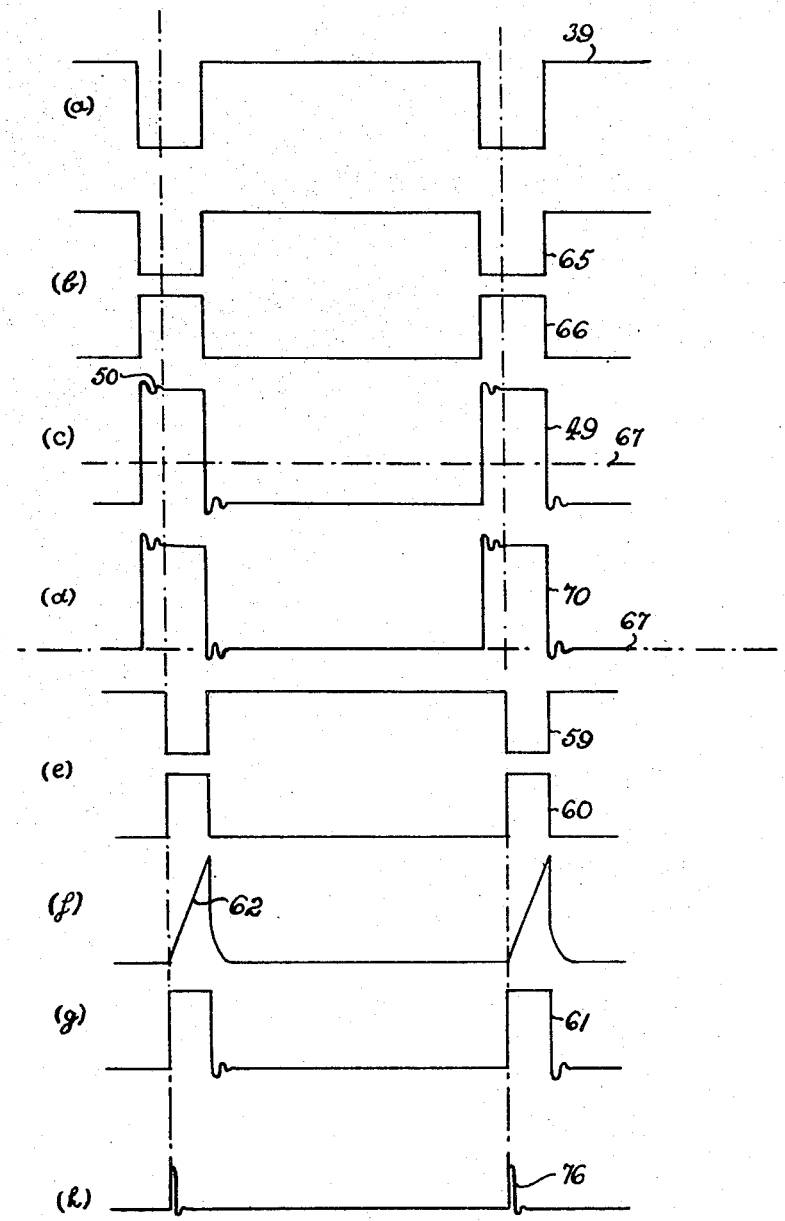

One embodiment of the invention will now be described, by way of example, with reference to the accompanying drawings in which Fig. 1 is a block schematic diagram of a radar plan position indicator system, Fig. 2 is an explanatory diagram showing the wave forms of voltages present at certain parts of the arrangement of Fig. 1, and Figs. 3, 4, 5 and 6 are theoretical circuit diagrams of some of the parts shown as blocks in Fig. 1.

In Fig. 1, pulses of rectangular wave form generated by a modulator unit 10 are applied to trigger a radar transmitter 11 having a radiator 12. These pulses will be referred to as zero-time pulses.

Further pulses of rectangular wave form, which will be referred to as pre-pulses, are also generated by the modulator unit 10. The pre-pulses are passed through a pulse generator 13 and a feedback amplifier 14 to the rotatable coil 15 of a goniometer 16. The goniometer 16 has two fixed coils 17 and 18 disposed at right angles to one another, and the rotatable coil 15 is coupled by mechanical or other means to a rotatable receiving aerial 19 as indicated by a broken line 20. The coil 15 therefore rotates in synchronism with the receiving aerial 19. It will be understood that the transmitting and receiving aerials may be common, or the transmitting aerial may be directional and rotatable and the receiving aerial omni-directional.

The rectangular pulses of current in the rotatable coil 15 induce pulses of current in the fixed coils 17 and 18, the amplitudes and polarities of which vary with rotation of the coil 15.

The polarity and magnitude of the pulses induced in the coil 17 at any instant are proportional to the sine of the angle between the axes of the coils 15 and 17, and at the same instant the polarity and magnitude of the pulses induced in the coil 18 are proportional to the cosine of the angle between the axes of the coils 15 and 18. A part of each pulse generated in the coils 17 and 18 is integrated by integrator circuits 21 and 22 as will be described later.

The outputs of the integrators are applied to cause radial deflection of the electron beam in a cathode ray tube 23 as previously described. The axes of the beam-deflecting means of the cathode ray tube 23, whether employing deflection coils or plates, are arranged in mutually perpendicular relationship, to correspond in relative relationship to the respective output coils of the goniometer to which they are connected. Since the induced currents in the coils 17 and 18 of the goniometer vary as a sine and cosine function of the angle between these coils and the input coil or rotor 15 of the goniometer, the amplitudes of the sawtooth waves developed by the integrators will depend respectively upon the position of the goniometer rotor with respect to the two stator windings. Hence, the direction of the radial sweep of the electron beam of the cathode ray tube will bear a fixed relation to the rotatable antenna. In other words, as the antenna rotates in azimuth, the direction of the radial electron beam sweep of the cathode ray tube will likewise rotate about the face of the tube and in synchronism with the antenna.

The function of the pulse generator 13 is to amplify the pre-pulses and then limit these pulses at a predetermined level independent of the amplitude of the pulses applied to the generator from the modulator unit 10. One known form which the pulse generator 13 may take is shown by the theoretical circuit diagram of Fig. 3.

The pre-pulses from the modulator unit 10 are applied at an input terminal 24 and thence to the control grid of an amplifier valve 25. The output of the valve 25 is applied to an output terminal 26 and is limited at a predetermined level by two pairs of limiting diodes 27, 28 and 29, 30. The level at which limiting occurs is determined by two potential dividers 31 and 32. The potential divider 31 consists of four resistors 33, 34, 35 and 36 of which 35 is a potentiometer. The anode of the diode 27 and cathode of the diode 28 are connected to the output terminal 26, the cathode of the diode 27 is connected to the junction of the resistors 33 and 34 and the anode of the diode 28 to the wiper 37 of the potentiometer 35. The upper terminal of the resistor 33 is connected to the positive terminal 38 of an accurately stabilised source of D. C. whose negative terminal is earthed. The lower terminal of the resistor 36 is connected to earth. The amplitude at which limiting takes place is determined by the setting of the potentiometer 35. The arrangement of the diodes 29 and 30 and potential divider 32 is identical with the arrangement of the diodes 27 and 28 and potential divider 31 and serves to increase the accuracy of the limiter. Thus accurately limited pulses appear at the output terminal 26 in the form shown by a curve 39 in Fig. 2(a). Throughout Fig. 2 the ordinates represent amplitude and the abscissae represent time. The wave forms shown in Fig. 2(a) to 2(f) respectively are those of the voltages present at points (a) to (f) Fig. 1.

Figure 4:
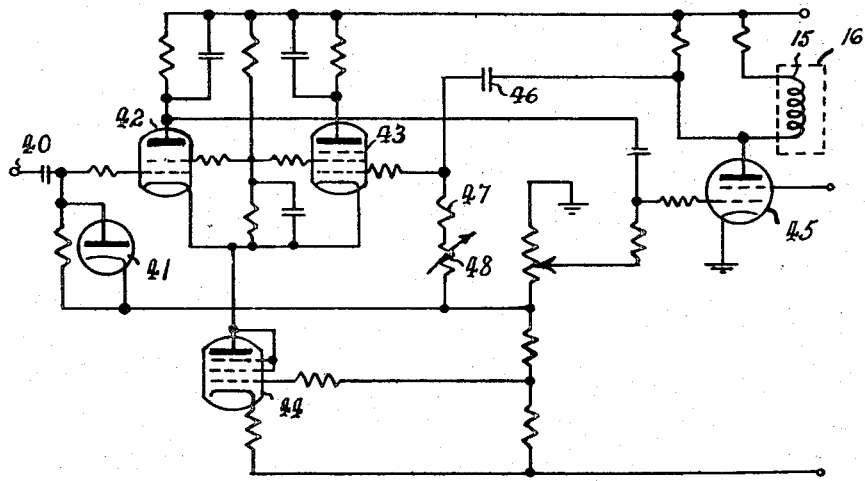

These pulses are applied to the feedback amplifier 14 (Fig. 1) which may be in any known or suitable form, for example as shown in Fig. 4. This amplifier is arranged to produce a voltage across the coil 15 (Fig. 1) which follows accurately the form shown in Fig. 2(a) despite the inductance and self capacitance of the coil 15.

The amplitude-limited negative-going pulses from the pulse generator 13 (Fig. 1) are applied to an input terminal 40 and a diode 41 acting as a D. C. restoring valve serves to render the base of each pulse at earth potential. D. C. restoration is used in order to prevent variations in the mean potential of the pulses with changes in the repetition frequency thereof.

The pulses are applied from the anode of the diode 41 to the control grid of a pentode valve 42 which is coupled to a second pentode valve 43 by means of a common cathode impedance in the form of a pentode valve 44. The voltage appearing at the anode of the pentode 42 is applied to the control grid of a tetrode 45 whose anode circuit includes the rotatable coil 15 of the gonimeter 16. Negative feedback is applied from the anode of the valve 45 to the control grid of the valve 43 by means of capacitor 46, fixed resistor 47 and variable resistor 48.

Owing to the leakage inductance and stray capacitance associated with the coils 15, 17 and 18, the voltages induced across the coils 17 and 18 are not truly rectangular as previously described. The form of. these induced currents is somewhat as shown in Fig. 2(c) by a curve 49. As will be seen from Fig. 2(c) an initial part 50 of each pulse is in the form of a damped oscillation. This damped oscillation, if allowed to reach the integrators 21 and 22 (Fig. 1), would cause distortion of the initial part of each working stroke of the saw-tooth voltages produced.

In order to avoid this, pulse-transfer control circuits 51 and 52 (Fig. 1) are used. These circuits operate to prevent the initial part 50 (Fig. 2(c)) of each induced pulse from reaching the integrators.

Figure 5:
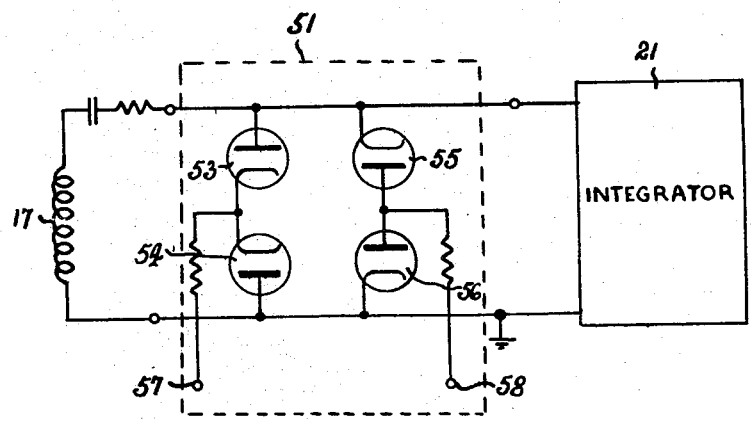
Figure 3:
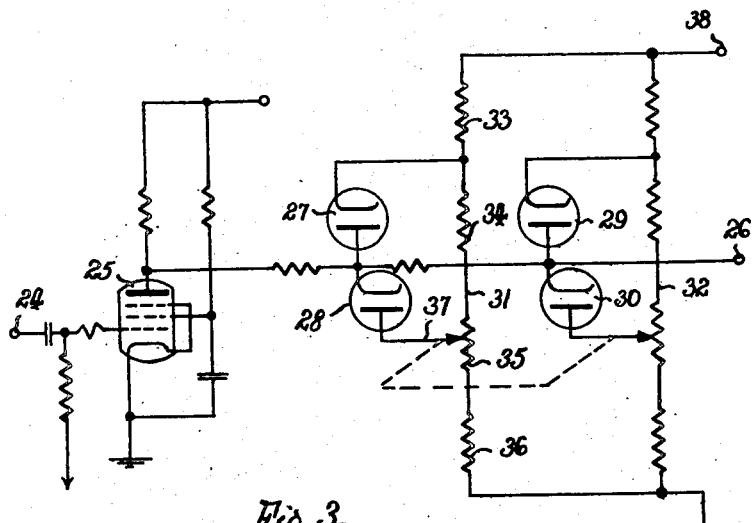

One form of the pulse-transfer control circuit 51 and 52 may be as shown within the dotted rectangle 51 in Fig. 5. This circuit comprises two pairs of diodes 53, 54 and 55, 56. The anodes of the diodes 53 and 54 are connected to the two terminals respectively of the coil 17 and their cathodes are connected together and to an input terminal 57. The cathodes of the diodes 55 and 56 are connected to the terminals of the coil 17 and their anodes are connected together and to a terminal 58. Hence when a negative potential is applied to terminal 57, diodes 53 and 54 are rendered conducting and the input of the integrator 21 is substantially short-circuited. Similarly when a positive potential is applied to the terminal 58 the diodes 55 and 56 are rendered conducting and substantially short-circuit the input of the integrator 21.

In Fig. 2(e) curves 59 and 60 illustrate the form of pulses applied to the circuit 51.

The pulses illustrated by the curve 59 are applied to the pulse-transfer control circuit 51 at terminal 58. Identical pulses but of opposite polarity as shown by the curve 60 in Fig. 2(e) are applied to the terminal 57 of the circuit 51. The commencement of the pulses 59 and 60 coincide with the commencement of the pulses transmitted by the transmitter 11, the latter pulses being, of course, of much shorter duration than the pulses 59 and 60, as indicated by the curve 76 in Fig. 2(h).

In this way the input of the integrator circuit 21 is short-circuited until the instant of transmission of each pulse from the transmitter 11.

As will be seen from Fig. 2(a) each pre-pulse is arranged to commence a few micro-seconds (say 100) before each zero-time pulse as shown in Fig. 2(e). Hence each pulse induced in the coil 17 is prevented from reaching the integrator 21 until the short-circuit across the input of the integrator 21 is lifted by the application of a zero-time pulse to the pulse-transfer control circuit 51. It is arranged that the time between the commencement of each pre-pulse and that of its corresponding zero-time pulse is sufficient to ensure that the damped oscillations 50 (Fig. 2(c)) have fallen to substantially zero amplitude, before the short circuit is removed from the input of the integrator circuits.

The form of the pulses applied in effect to the integrator 21 is therefore of the form shown by a curve 61 in Figure 2(g) and the saw-tooth output of the integrator is as shown by a curve 62 in Fig. 2(f).

The operation of the pulse-transfer control circuit 52 is arranged to be identical with that of the pulse-transfer control circuit 51.

Pre-pulse D. C. restoring circuits 63 and 64 (Figure 1) are connected between the coils 17, 18 and the pulse-transfer control circuits 51 and 52 to apply D. C. restoration to the pulses applied from the coils 17 and 18 to the pulse-transfer control circuits 51 and 52. In other words, the circuits 63 and 64 constitute direct current restoration circuits or means for maintaining the level of the base of the pulse substantially fixed, that is, these circuits control the D. C. component of the signal such that the base of the pulses is maintained at some predetermined potential level, such as ground potential. The pre-pulse D. C. restoring circuits may be identical with the pulse-transfer control circuit 51 shown in Fig. 5. The pre-pulses generated by the modulator unit 10 are applied to the D. C. restoring circuits to remove the D. C. restoration during each pre-pulse. Two curves 65 and 66 in Fig. 2(b) show the form of pulses applied to the D. C. restoring circuits. The output of say coil 17, without D. C. restoration, is shown by the curve 49 of Fig. 2(c) to be alternating above and below earth potential indicated by a chain-dotted line 67. The output of the coil 17 with D. C. restoration is shown by the curve 70 in Fig. 2(d).

The purpose in applying this D. C. restoration is to ensure that the potential of the pulses does not vary with changes in the repetition frequency thereof.

Figure 6:
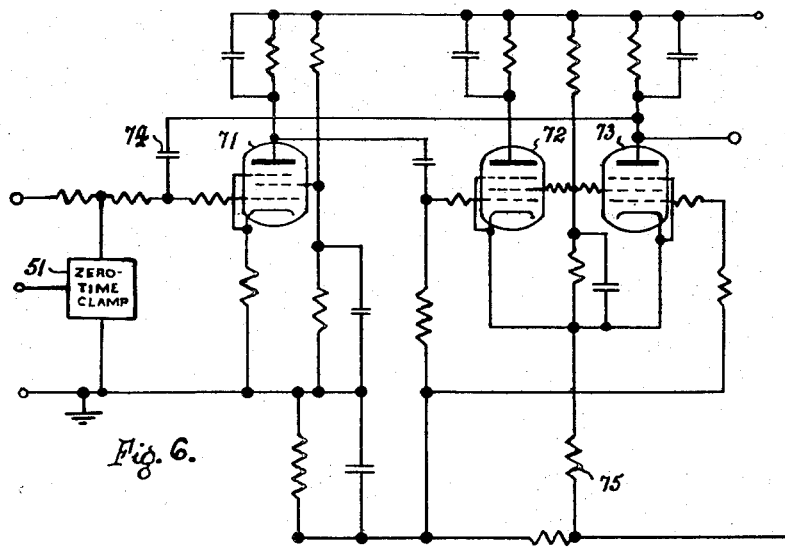

The circuit of each of the integrator devices may be as shown in Fig. 6. This circuit comprises an amplifier having three valves 71, 72, 73. The valve 71 is arranged as an amplifier in conventional manner and the valves 72 and 73 are coupled by a common cathode impedance 75, a capacitor 74 being connected between the output and input of the amplifier. This circuit is arranged in such a manner that the output voltage is proportional to the integral of the input voltage with respect to time.

It will be understood that if desired only a predetermined range of the working stroke of each saw-tooth may be used whereby the centre of rotation of the radial scan is other than at the centre of the screen of the cathode ray tube 23 (Fig. 1). The centre of rotation may be off the screen if desired.

I claim:

1. Time base apparatus for providing two trains of pulses whose wave form is of saw-tooth shape and whose amplitudes and polarities are collectively representative of the angular displacement of a rotatable member, the apparatus comprising two output inductors arranged substantially in mutually perpendicular relation, an input circuit including at least one input inductor co-operating with said output inductors, means for rotating said input inductor relatively to said output inductors in synchronism with said rotatable member to couple said input circuit to said output inductors in dependence upon the sine and cosine respectively of the angle of displacement of said rotatable member, a source of pulses of rectangular wave form, means for applying said pulses of rectangular wave form to said input circuit, and means for integrating the outputs of said output inductors respectively.

2. Time base apparatus for providing two trains of pulses whose wave form is of saw-tooth shape and whose amplitudes and polarities are collectively representative of the angular displacement of a rotatable member, the apparatus comprising two output inductors arranged substantially in mutually perpendicular relation, an input circuit including at least one input inductor co-operating with said output inductors, means for rotating said input inductor relatively to said output inductors in synchronism with said rotatable member to couple said input circuit to said output inductors in dependence upon the sine and cosine respectively of the angle of displacement of said rotatable member, a source of pulses of rectangular wave form, means for applying said pulses of rectangular wave form to said input circuit to cause pulses to be induced in said output inductors, integrating means connected to integrate the outputs of said output inductors respectively, and means for preventing an initial part of each output pulse from reaching said integrating means.

3. Time base apparatus for providing two trains of pulses whose wave form is of saw-tooth shape and whose amplitudes and polarities are collectively representative of the angular displacement of a rotatable member, the apparatus comprising two output inductors arranged substantially in mutually perpendicular relation, an input circuit including at least one input inductor co-operating with said output inductors, means for rotating said input inductor relatively to said output inductors in synchronism with said rotatable member to couple said input circuit to said output inductors in dependence upon the sine and cosine respectively of the angle of displacement of said rotatable member, a source of main pulses of rectangular wave form, a source of secondary pulses also of rectangular wave form and of the same repetition frequency as the main pulses but having leading edges occurring after those of the main pulses, means for applying said main pulses to said input circuit, integrating means for integrating the outputs of said output inductors respectively, a pulse-transfer control circuit connected in shunt with the input of each of said integrating means for controlling the transfer of pulses from said output inductors to said integrating means, and means for applying said secondary pulses to said pulse-transfer control circuit to render said pulse-transfer control circuit conducting until the occurrence of said leading edges of said secondary pulses.

4. Time base apparatus according to claim 3, comprising direct current restoration means for maintaining the base of the main pulses at a predetermined potential level, said means being connected between said output inductors and said pulse-transfer control circuits.

5. Time base apparatus for providing two trains of pulses whose wave form is of saw-tooth shape and whose amplitudes and polarities are collectively representative of the angular displacement of a rotatable member, the apparatus comprising two output inductors arranged substantially in mutually perpendicular relation, an input circuit including at least one input inductor co-operating with said output inductors, means for rotating said input inductor relatively to said output inductors in synchronism with said rotatable member to couple said input circuit to said output inductors in dependence upon the sine and cosine respectively of the angle of displacement of said rotatable member, a source of pulses of rectangular wave form, means for applying said pulses of rectangular wave form to said input circuit, means for integrating the outputs of said output inductors respectively, and direct current restoration means for maintaining the base of said rectangular pulses at a predetermined potential level, said means being connected between said output inductors and said integrating means.

6. A radar plan position indicator including time base apparatus for providing two trains of pulses whose wave form is of saw-tooth shape and whose amplitudes and polarities are collectively representative of the angular displacement of a rotatable member, the time base apparatus comprising two output inductors arranged substantially in mutually perpendicular relation, an input circuit including at least one inductor co-operating with said output inductors, means for rotating said input inductor relatively to said output inductors in synchronism with said rotatable member to couple said input circuit to said output inductors in dependence upon the sine and cosine respectively of the angle of displacement of said rotatable member, a source of pulses of rectangular wave form, means for applying said pulses of rectangular wave form to said input circuit, and means for integrating the outputs of said output inductor to provide said trains of pulses of saw-tooth wave form, said indicator also including means for transmitting an exploring pulse at the commencement of each saw-tooth pulse, a cathode ray tube and means for applying said pulses of saw-tooth wave form to deflecting means of said cathode ray tube.

7. A radar plan position indicator including time base apparatus for providing two trains of pulses whose wave form is of saw-tooth shape and whose amplitudes and polarities are collectively representative of the angular displacement of a rotatable member, the apparatus comprising two output inductors arranged substantially in mutually perpendicular relation, an input circuit including at least one input inductor co-operating with said output inductors, means for rotating said input inductor relatively to said output inductors in synchronism with said rotatable member to couple said input circuit to said output inductors in dependence upon the sine and cosine respectively of the angle of displacement of said rotatable member, a source of main pulses of rectangular wave form, a source of secondary pulses also of rectangular wave form and of the same repetition frequency as the main pulses but having leading edges occurring after those of the main pulses, means for applying said main pulses to said input circuit, integrating means for integrating the outputs of said output inductors respectively, a pulse-transfer control circuit connected in shunt with the input of each of said integrating means for controlling the transfer of pulses from said output inductors to said integrating means, and means for applying said secondary pulses to said pulse-transfer control circuit to render said pulse-transfer control circuit conducting until the occurrence of said leading edges of said secondary pulses, said indicator also including means for transmitting an exploring pulse at the commencement of each pulse in the output of said integrating means, a cathode ray tube, and means for applying said pulses of sawtooth wave form to deflecting means of said cathode ray tube.

8. A radar plan position indicator as claimed in claim 7, comprising direct current restoration means for maintaining the base of the main pulses at a predetermined potential level, said means being connected between said output inductors and said pulse-transfer control circuits.

LIONEL JOFEH.

REFERENCES CITED

The following references are of record in the file of this patent:

UNITED STATES PATENTS

| Number | Name | Date |
|---|---|---|
| 2,400,791 | Tolson | May 21, 1946 |
| 2,409,456 | Tolson | Oct. 15, 1946 |